(12) United States Patent
Ko et al.

(10) Patent No.: US 9,983,629 B2
(45) Date of Patent: May 29, 2018

(54) ELECTRONIC DEVICE INCLUDING FLEXIBLE DISPLAY ELEMENT

(71) Applicant: Samsung Electronics Co., Ltd., Suwon-si, Gyeonggi-do (KR)

(72) Inventors: Jae-Hun Ko, Seoul (KR); Jung-Hyun Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 15 days.

(21) Appl. No.: 14/834,987

(22) Filed: Aug. 25, 2015

(65) Prior Publication Data

US 2016/0062410 A1    Mar. 3, 2016

(30) Foreign Application Priority Data

Aug. 28, 2014  (KR) .......................... 10-2014-0133192

(51) Int. Cl.
  *G06F 1/16*  (2006.01)
  *A44C 5/00*  (2006.01)

(52) U.S. Cl.
  CPC ............ *G06F 1/1652* (2013.01); *G06F 1/163* (2013.01); *G06F 1/1681* (2013.01); *A44C 5/0053* (2013.01)

(58) Field of Classification Search
  CPC ...... G06F 1/1652; G06F 1/163; G04G 17/083
  See application file for complete search history.

(56) References Cited

U.S. PATENT DOCUMENTS

| 4,412,751 A | 11/1983 | Jeannet et al. | |
|---|---|---|---|
| 6,577,496 B1* | 6/2003 | Gioscia | G06F 1/1616 345/156 |
| 9,442,563 B2* | 9/2016 | Mullen | G06F 1/1624 |
| 2011/0014956 A1* | 1/2011 | Lee | H04M 1/274525 455/569.1 |
| 2011/0286157 A1* | 11/2011 | Ma | G06F 1/1652 361/679.01 |
| 2012/0204453 A1* | 8/2012 | Jung | G09F 9/301 40/517 |
| 2012/0264489 A1* | 10/2012 | Choi | H04M 1/0216 455/566 |
| 2012/0307472 A1* | 12/2012 | Bohn | G06F 1/1616 361/807 |
| 2012/0314399 A1* | 12/2012 | Bohn | G06F 1/1616 362/97.1 |
| 2013/0222271 A1* | 8/2013 | Alberth | G06F 1/163 345/173 |

(Continued)

FOREIGN PATENT DOCUMENTS

KR   10-2014-0101274 A   8/2014

*Primary Examiner* — Binh Tran
*Assistant Examiner* — Douglas Burtner
(74) *Attorney, Agent, or Firm* — Jefferson IP Law, LLP

(57) ABSTRACT

An electronic device is provided. The electronic device includes a main body including a rigid section portion, and a flexible section portion extending from at least one side of the rigid section portion, and a display element, at least a portion of which is disposed on the rigid section portion and another portion is disposed on the flexible section portion. The flexible section portion is bendable to be curved in relation to the rigid section portion, and the display element may be bent to be curved in relation to the rigid section portion together with the flexible section portion.

14 Claims, 9 Drawing Sheets

(56) References Cited

U.S. PATENT DOCUMENTS

| | | | | |
|---|---|---|---|---|
| 2014/0029171 | A1* | 1/2014 | Lee | H05K 7/16 |
| | | | | 361/679.01 |
| 2014/0029190 | A1* | 1/2014 | Sato | G06F 1/1641 |
| | | | | 361/679.27 |
| 2014/0160055 | A1* | 6/2014 | Margolis | G06F 1/163 |
| | | | | 345/174 |
| 2014/0226275 | A1* | 8/2014 | Ko | G06F 1/1626 |
| | | | | 361/679.27 |
| 2014/0320396 | A1* | 10/2014 | Modarres | G06F 3/0412 |
| | | | | 345/156 |
| 2014/0362513 | A1* | 12/2014 | Nurmi | G06F 1/1652 |
| | | | | 361/679.27 |
| 2015/0177782 | A1* | 6/2015 | Saitoh | G06F 1/1601 |
| | | | | 361/679.03 |
| 2015/0177789 | A1* | 6/2015 | Jinbo | G06F 1/1652 |
| | | | | 313/511 |
| 2015/0261259 | A1* | 9/2015 | Endo | G06F 1/1652 |
| | | | | 361/679.06 |
| 2015/0378391 | A1* | 12/2015 | Huitema | G06F 1/163 |
| | | | | 361/679.03 |
| 2015/0378397 | A1* | 12/2015 | Park | G06F 1/1652 |
| | | | | 361/679.27 |
| 2016/0266672 | A1* | 9/2016 | Inagaki | G09F 9/30 |
| 2016/0357158 | A1* | 12/2016 | Kim | G06F 1/163 |
| 2017/0192460 | A1* | 7/2017 | Watanabe | G06F 1/1652 |
| 2017/0208466 | A1* | 7/2017 | Seo | H04W 12/06 |
| 2017/0235341 | A1* | 8/2017 | Huitema | G06F 1/1652 |
| | | | | 361/679.03 |
| 2017/0364123 | A1* | 12/2017 | Seo | G06F 1/1652 |

\* cited by examiner

ELECTRONIC DEVICE INCLUDING FLEXIBLE DISPLAY ELEMENT

CROSS-REFERENCE TO RELATED APPLICATION(S)

This application claims the benefit under 35 U.S.C. § 119(a) of a Korean patent application filed on Aug. 28, 2014 in the Korean Intellectual Property Office and assigned Serial number. 10-2014-0113192, the entire disclosure of which is hereby incorporated by reference.

TECHNICAL FIELD

The present disclosure relates to an electronic device. More particularly, the present disclosure relates to an electronic device having a sufficient screen size including a flexible display element being bendable in a curved form so as to be wearable on a user's body portion.

BACKGROUND

An electronic device is a device that performs specific functions according to programs incorporated therein, such as an electronic scheduler, a portable multimedia reproducer, a mobile communication terminal, a tablet personal computer (PC), an image/sound device, a desktop/laptop computer, or a vehicular navigation system, including a home appliance. For example, such an electronic device may output information stored therein, in the form of a character, a sound, or an image. As the integration of electronic devices has increased and super-high speed and large capacity wireless communication has been popularized, various functions have recently been incorporated into a single mobile communication terminal. For example, in addition to a communication function, an entertainment function, such as a game, a multimedia function, such as music/video image reproduction, a communication and security function for, e.g., mobile banking, and a function of schedule management or electronic wallet, are integrated into a single electronic device.

Electronic devices to be used in a portable manner, such as an electronic scheduler, a portable multimedia reproducer, a mobile communication terminal, and a tablet PC, are generally equipped with a flat display device and a battery, and have a bar-type, folder-type, or sliding-type exterior due to the shape of the display device or the battery. Currently, as the electronic devices have been miniaturized with the advancement of electronic telecommunication technologies, electronic devices that are wearable on a part of a human body, such as a wrist or head, have become commercially available.

In order to ensure a comfortable wearing feeling of a wearable electronic device, miniaturizing and reducing the weight of the wearable electronic device may be required. In a miniaturized and lightened electronic device, a space for installing hardware, such as various input/output devices or a battery, may be limited. In addition, a wearable electronic device may be changed in shape according to the curve of a user's body portion, a space for installing, for example, a flat display device may be further limited so that the size of a screen to be output may be restricted.

Therefore, a need exists for an electronic device having a sufficient screen size as well as being bendable in a curved form so as to be wearable on a user's body portion.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device having a sufficient screen size as well as being bendable in a curved form so as to be wearable on a user's body portion.

Another aspect of the present disclosure is to provide an electronic device having a structure capable of stably supporting and protecting a flexible display element.

In accordance with an aspect of the present disclosure, an electronic device is provided. The electronic device includes a main body including a rigid section portion, and a flexible section portion extending from at least one side of the rigid section portion, and a display element, at least a portion of which is disposed on the rigid section portion and another portion is disposed on the flexible section portion. The flexible section portion is bendable to be curved in relation to the rigid section portion, and the display element may be bent to be curved in relation to the rigid section portion together with the flexible section portion.

According to various embodiments of the present disclosure, the electronic device may provide a comfortable wearing feeling since the flexible section portion is provided in the main body so as to be bendable to conform to the curvature of the user's body portion when the electronic device is worn on the user's body portion.

According to various embodiments of the present disclosure, the display element may be configured as a flexible display element, and a portion of the display element may be disposed on the flexible section portion to be bent to conform to the curvature of the user's body portion together with the flexible section portion. Accordingly, the electronic device is capable of outputting a further expanded screen as compared with an electronic device equipped with a flat display device.

According to various embodiments of the present disclosure, the display element is configured to be slidable in relation to the rigid section portion or the flexible section portion so that, even if the mounting surface of the display element is displaced longitudinally as the curvature of the flexible section is changed, it is possible to prevent, for example, tension from being applied to the display element.

According to various embodiments of the present disclosure, it is possible to suppress the longitudinal displacement of the flexible section portion according to the change of the curvature on the display mounting surface, and it is possible to guide the longitudinal displacement to another surface so as to prevent tension from being applied to the display element. Consequently, the display element can be stably protected and supported.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
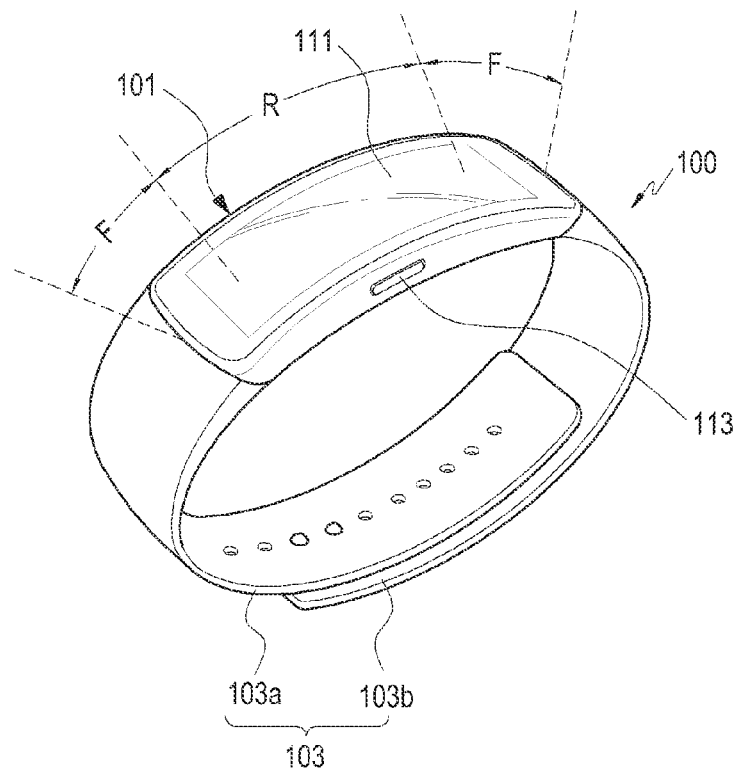
FIG. 1 is a perspective view illustrating an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Although ordinal terms, such as "first" and "second," may be used to describe various elements, these elements are not limited by the terms. The terms are used merely for the purpose to distinguish an element from the other elements. For example, a first element could be termed a second element, and similarly, a second element could be also termed a first element without departing from the scope of the present disclosure. As used herein, the term "and/or" includes any and all combinations of one or more associated items.

Further, the relative terms "a front surface", "a rear surface", "a top surface", "a bottom surface", and the like which are described with respect to the orientation in the drawings may be replaced by ordinal numbers, such as first and second. In the ordinal numbers, such as first and second, their order are determined in the mentioned order or arbitrarily and may not be arbitrarily changed if necessary.

In the description, it should be understood that the terms "include" or "have" indicate existence of a feature, a number, an operation, a structural element, parts, or a combination thereof, and do not previously exclude the existences or probability of addition of one or more another features, numeral, operations, structural elements, parts, or combinations thereof Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present specification.

In various embodiment of the present disclosure, an electronic device may be a random device, and the electronic device may be called a terminal, a portable terminal, a mobile terminal, a communication terminal, a portable communication terminal, a portable mobile terminal, a display device, and the like.

For example, the electronic device may be a smartphone, a portable phone, a game player, a television (TV), a display unit, a heads-up display unit for a vehicle, a notebook computer, a laptop computer, a tablet personal computer (PC), a personal media player (PMP), a personal digital assistant (PDA), and the like. The electronic device may be implemented as a portable communication terminal which has a wireless communication function and a pocket size. Further, the electronic device may be a flexible device or a flexible display device.

The electronic device may communicate with an external electronic device, such as a server and the like, or perform an operation through an interworking with the external electronic device. For example, the electronic device may transmit an image photographed by a camera and/or position information detected by a sensor unit to the server through a network. The network may be a mobile or cellular communication network, a local area network (LAN), a wireless LAN (WLAN), a wide area network (WAN), an Internet, a small area network (SAN), and the like, but is not limited thereto.

FIG. 1 is a perspective view illustrating an electronic device according to an embodiment of the present disclosure.

Referring to FIG. 1, an electronic device 100 may include a main body 101 that includes a rigid section portion R and a flexible section portion F. The flexible section portion F may be provided at one side or each side of the rigid section portion R. In the illustrated embodiment of the present disclosure, a configuration is exemplified, in which flexible section portions F extend in the directions away from each other from opposite sides of the rigid section portion R, respectively. The flexible section portions F are bendable with respect to the rigid section portion R. On one surface (e.g., an outer surface) of the main body 101, a display element 111 may be mounted. For example, the display element 111 may be formed of a flexible display element, a portion of which may be disposed on the rigid section portion R and another portion may be disposed on the flexible section portion F. As the flexible section portions F are bendable, the display element 111 is also bendable together with the flexible section portions.

The main body 101 may include a button 113 provided on a side surface thereof as an input device. Furthermore, various input/output devices, such as a microphone and a speaker phone for input/output of a sound, a camera module for photographing, and various sensor modules (e.g., a proximity light sensor and a gyro sensor), may be mounted on the main body 101.

The electronic device 100 may be configured as a bar-type electronic device including only the main body 101. According to various embodiments of the present disclosure, the electronic device 100 may further include a wearing unit 103 to be configured as a wearable electronic device. The main body 101 in the case where the electronic device 100 is configured as a bar-type electronic device may be of different size that of the main body 101 in the case where the electronic device 100 is configured as a wearable electronic device.

The wearing unit 103 may include band-type wearing members 103a and 103b, which extend from the flexible section portions F, respectively. The wearing member 103a and 103b may form a closed curve shape when the ends thereof are bound to each other, and may function like a watch band so as to allow the main body 101 to be worn on the user's body portion. Although not illustrated, a fastening member, such as a hook or a buckle, may be provided on the end of each of the wearing member 103a and 103b.

According to various embodiments of the present disclosure, the wearing unit 103 may be formed of a single band, one end of which is connected to one of the flexible section portions F and the other end is connected to the other one of the flexible section portion F, so that the electronic device 100 may form a closed curve shape by itself According to various embodiments of the present disclosure, the wearing unit 103 may be formed of a single band, one end of which extends from one of the flexible section portions F and the other end is configured to be removably coupled to the other one of the flexible section portions F.

The configurations of the wearing unit 103 as described above may be properly selected by a person ordinarily skilled in the art based on, for example, a use or a design of an actual product.

Figure 2:
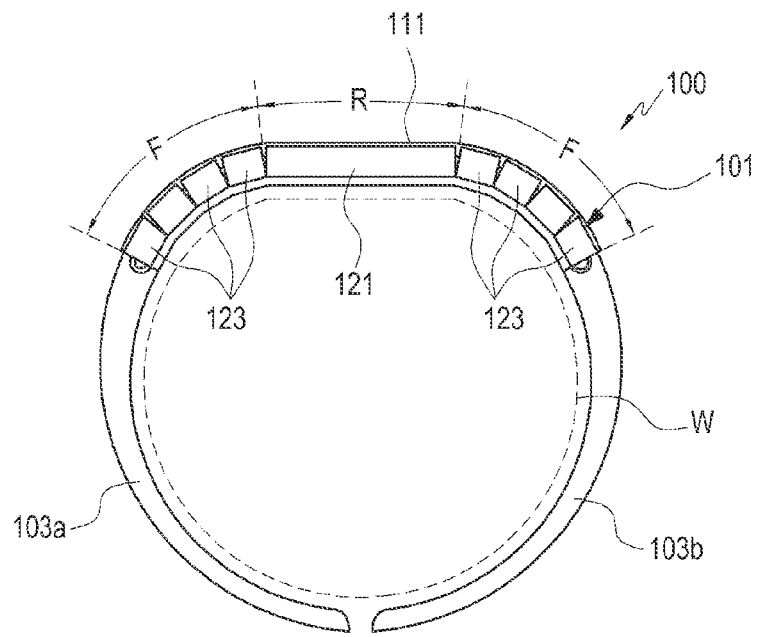
FIG. 2 is a sectional view illustrating a configuration of an electronic device according to an embodiment of the present disclosure.

FIG. 2 is a sectional view illustrating a configuration of an electronic device according to an embodiment of the present disclosure.

Figure 3:
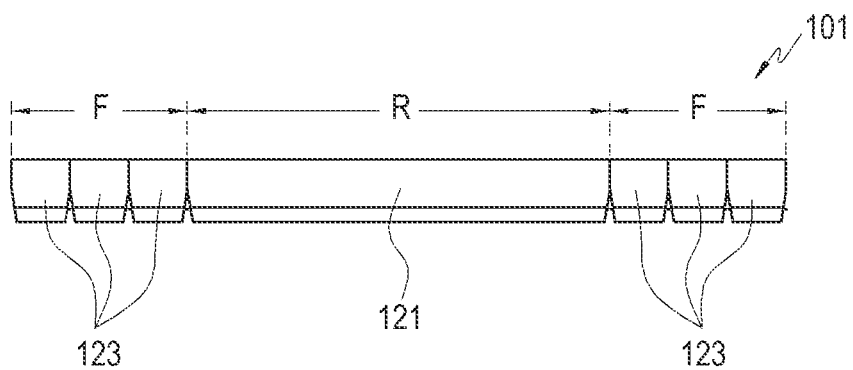
FIG. 3 is a sectional view illustrating a configuration of a main body of an electronic device according to an embodiment of the present disclosure.

FIG. 3 is a sectional view illustrating a configuration of a main body of an electronic device according to an embodiment of the present disclosure.

Figure 4:
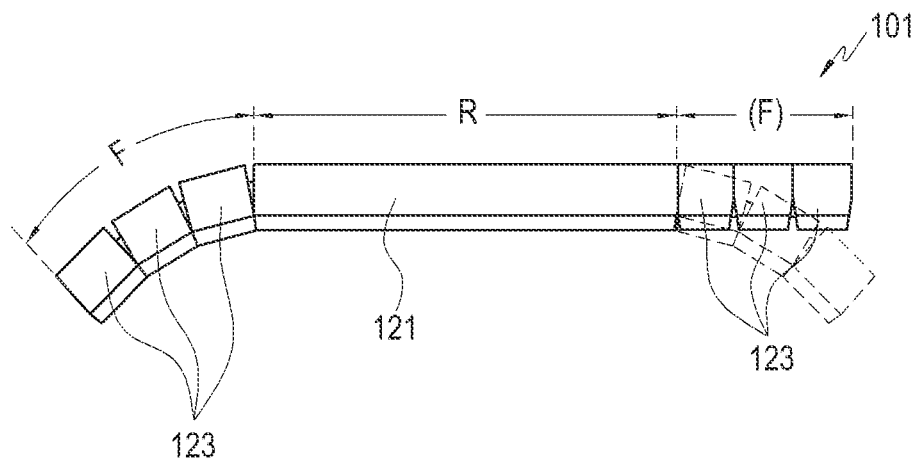
FIG. 4 is a sectional view illustrating a shape of a main body of an electronic device which is bent to be curved according to an embodiment of the present disclosure.

FIG. 4 is a sectional view illustrating a shape of a main body of an electronic device which is bent to be curved according to an embodiment of the present disclosure.

Figure 5:
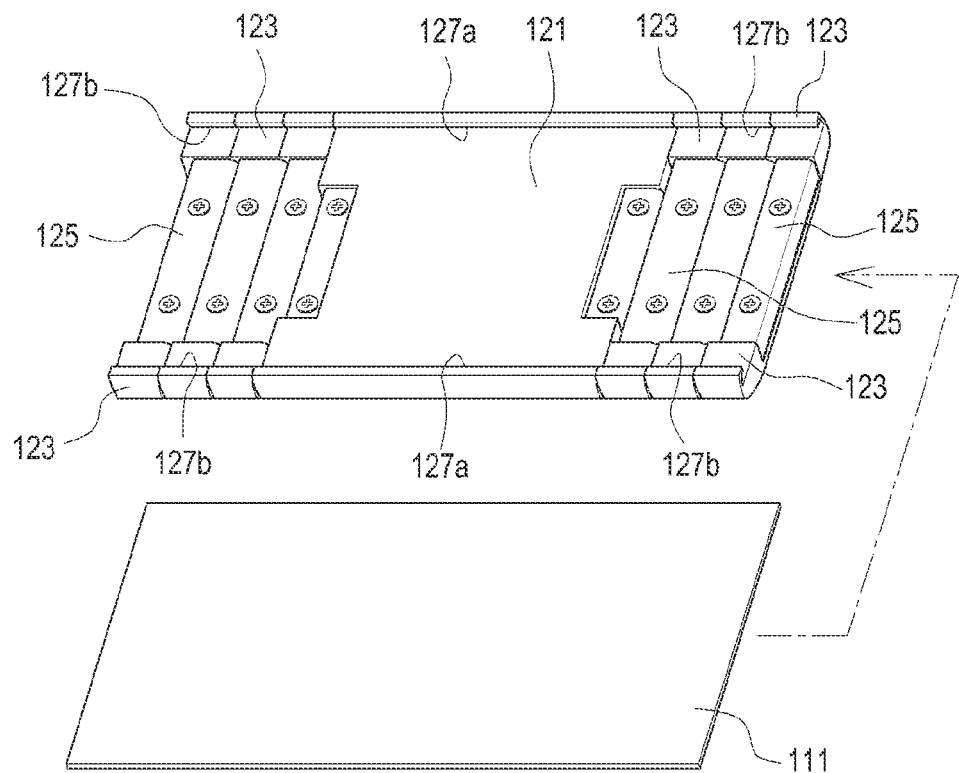
FIG. 5 is a perspective view illustrating a structure of a main body of an electronic device according to an embodiment of the present disclosure.

FIG. 5 is a perspective view illustrating a structure of a main body of an electronic device according to an embodiment of the present disclosure.

Figure 6:
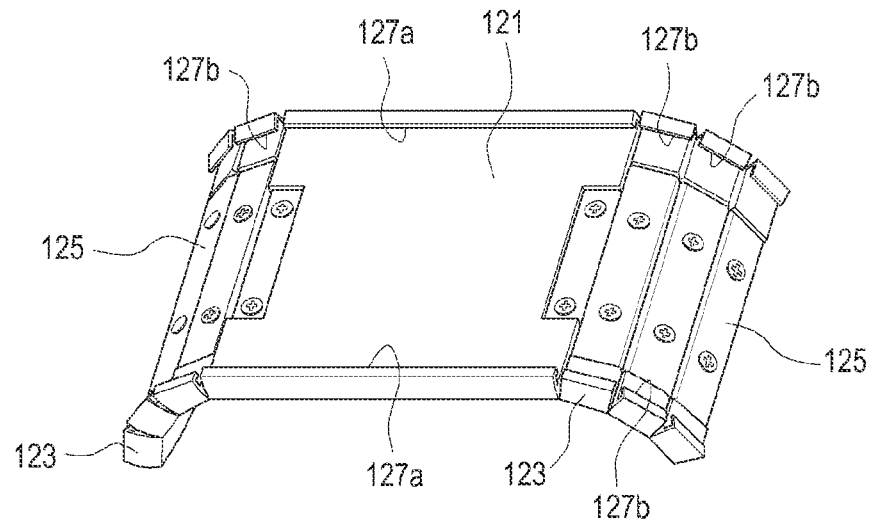
FIG. 6 is a perspective view illustrating a shape of a main body of an electronic device which is bent to be curved according to an embodiment of the present disclosure.

FIG. 6 is a perspective view illustrating a shape of a main body of an electronic device which is bent to be curved according to an embodiment of the present disclosure.

Referring to FIGS. 2, 3, 4, 5, and 6, the main body 101 may include a support member 121 having a flat panel shape, and a plurality of rotary members 123 sequentially arranged from opposite ends of the support member 121. Each of the rotary members 123 may be rotatably coupled to another adjacent rotary member or to the support member. The support member 121 may be positioned on the rigid section portion R, and the rotary members 123 may be positioned on the flexible section portions F. As the rotary members 123 are rotated in relation to each other, the flexible section portions F may be bent to be curved in relation to the rigid section portion R. When the user wears the electronic device 100 on the user's body portion (e.g., a wrist W), the wearing unit 103 is bound to wrap around the user's body portion. At this time, the flexible section portion F may be bent to be curved to conform to the curvature of the user's body portion.

Opposite side edges of the support member 121, and both side edges of the rotary members 123 may be formed with support slits 127a and 127b, respectively. When the rotary members 123 are arranged to form a single flat panel shape together with the support member 121, the support slits 127a and 127b may be successively arranged to form straight lines. Opposite side edges of the display element 111 may be inserted into the support slits 127a and 127b. For example, each of the support slits 127a and 127b may accommodate and support a part of the side edges of the display element 111.

The display element 111 may be formed of a flexible display element, which may be partially fixed to any of the support member 121 and the rotary members 123. For example, the display element 111 may be fixed to one surface (e.g., an outer surface) of the support member 121.

When the rotary members 123 are rotated, causing a change in the length of the surface on which the display element 111 is mounted (e.g., a change in the gaps between the rotary members in the mounting surface), the display element 111 may be slid with respect to the rotary members 123. For example, even if a longitudinal displacement occurs in the surface on which the display element 111 is mounted as the flexible section portions F are bent to be curved to conform to the curvature of the user's body portion, it is possible to prevent, for example, tension from being applied to the display element 111.

According to various embodiments of the present disclosure, the rotary members 123 may be connected to each other through hinge members 125 to be rotatable in relation to each other. The structure of the flexible section portion F formed by the rotary members 123 and the hinge members 125 will be further described with reference to, for example, FIG. 7.

Figure 7:
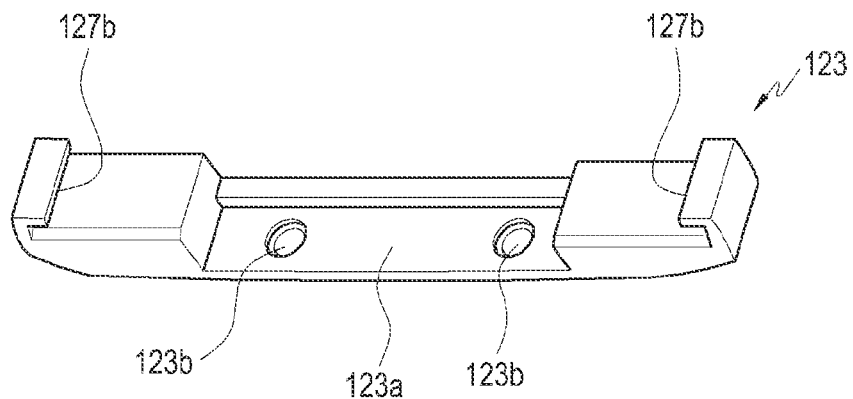
FIG. 7 is a perspective view illustrating a rotary member of an electronic device according to an embodiment of the present disclosure.

FIG. 7 is a perspective view illustrating a rotary member of an electronic device according to an embodiment of the present disclosure.

Referring to FIG. 7, the rotary member 123 may include the support slits 127b which are respectively formed in both side edges of the outer surface, on which the display element 111 is mounted. As described above, the support slits 127b may partially accommodate and support the edges of the display element 111, respectively. The rotary member 123 may include a seating recess 123a opened above the surface on which the display element 111 is mounted. On the bottom of the seating recess 123a, fastening holes 123b may be formed. The above-described rotary member 123 may be formed of any one of a metal, such as aluminum, and a synthetic resin, such as polycarbonate. The rotary members 123 as described above may be rotatably coupled to other rotary members 123 through the hinge members 125.

Figure 8:
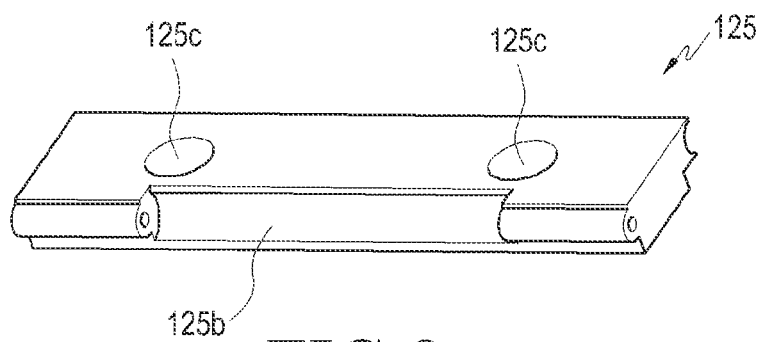
FIG. 8 is a perspective view illustrating a hinge member of an electronic device according to an embodiment of the present disclosure.

FIG. 8 is a perspective view illustrating a hinge member of an electronic device according to an embodiment of the present disclosure.

Figure 9:
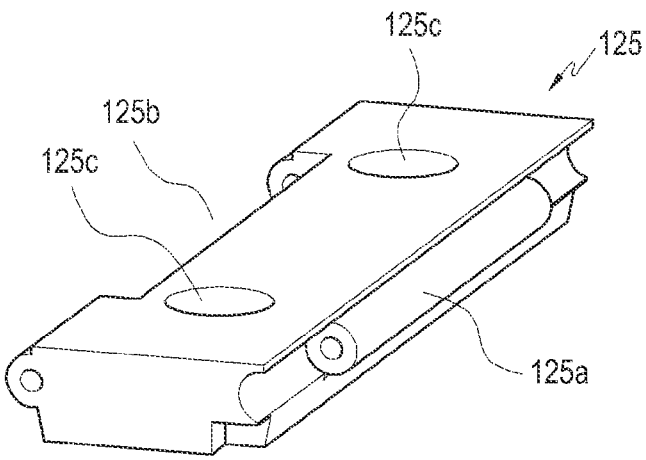
FIG. 9 is a perspective view illustrating a hinge member of an electronic device which is viewed from a different direction according to an embodiment of the present disclosure.

FIG. 9 is a perspective view illustrating a hinge member of an electronic device which is viewed from a different direction according to an embodiment of the present disclosure.

Referring to FIGS. 8 and 9, the hinge member 125 is shaped to correspond to the seating recess 123a of the rotary member 123 and may include a convex portion 125a formed in one end and a concave portion 125b formed in the other end. In addition, the hinge member 125 may include second fastening holes 125c formed to extend from the top surface to the bottom surface through the hinge member 125. When the hinge member is seated in the seating recess 123a of the rotary member 123, the second fastening holes 125c are aligned to the fastening holes 123b, respectively. When the fastening holes 123b and 125c are aligned to each other, fastening elements, such as screws, may be fitted thereto so as to fix the hinge members 125 to the rotary members 123. The concave portion 125b may accommodate the convex portion 125a of another hinge member 125, and a binding element, such as a pin or a free stop module to be described later, may rotatably couple the convex portion 125a to the concave portion 125b of another hinge member 125. Based on, for example, endurance, the hinge member 125 may be made of a metal.

The shapes of the seating recess 123a of the rotary member 123 and the hinge member 125 may be variously changed based on, for example, the specification and external appearance of a product to be actually fabricated.

Figure 10:
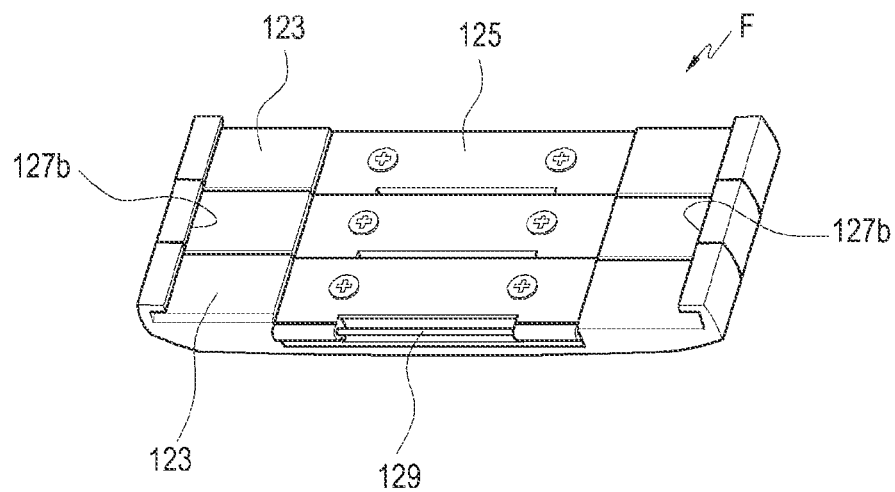
FIG. 10 is a perspective view illustrating a part of a main body of an electronic device according to an embodiment of the present disclosure.

FIG. 10 is a perspective view illustrating a part of a main body of an electronic device according to an embodiment of the present disclosure.

Figure 11:
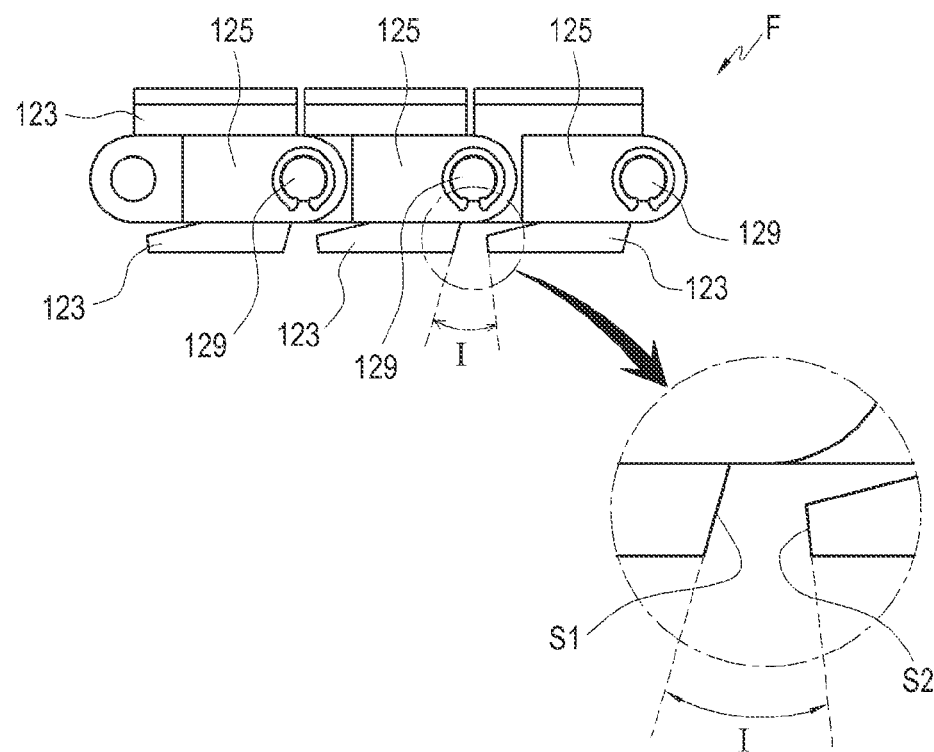
FIG. 11 is a side view illustrating a part of a main body of an electronic device according to an embodiment of the present disclosure.

FIG. 11 is a side view illustrating a part of a main body of an electronic device according to an embodiment of the present disclosure.

Figure 12:
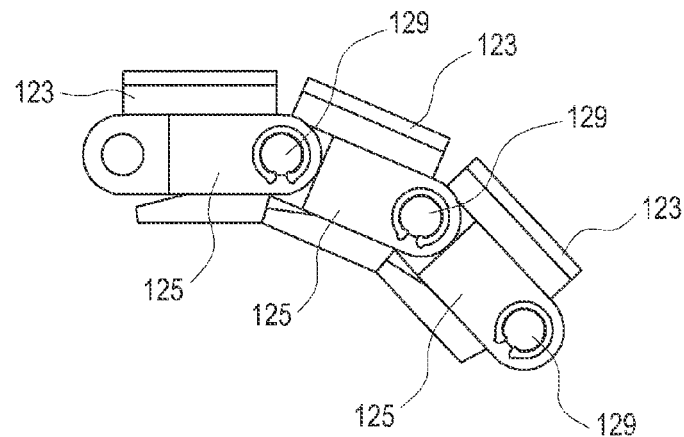
FIG. 12 is a side view illustrating a part of a main body of an electronic device where the part of the main body of the electronic device is bent to be curved according to an embodiment of the present disclosure.

FIG. 12 is a side view illustrating a part of a main body of an electronic device where the part of the main body of the electronic device is bent to be curved according to an embodiment of the present disclosure.

Referring to FIGS. 10, 11, and 12, when the hinge members 125 are coupled to the rotary members 123, respectively, a free stop module 129 may rotatably couple one hinge member 125 to another adjacent hinge member 125. For example, each free stop module 129 is inserted into the concave portion 125b formed in one hinge member 125 and fitted through the convex portion 125a of another hinge member 125, which is accommodated in the concave portion 125b, so that adjacent hinge members 125 can be rotatably coupled to each other. Each of the free stop modules 129 may provide frictional force using, for example, a leaf spring, or may maintain a stopped angle of one hinge member 125 in relation to another hinge member 125 using, for example, a serration structure. For example, the free stop modules 129 may provide a restraint force that maintains the hinge members 125 in the state of being stopped in relation to each other. The hinge member 125 positioned at one end of the flexible section portion F may be fixedly or rotatably coupled to the rigid section portion R.

Each of the rotary members 123 may be provided with inclined surfaces s1 and s2 that secure intervals that allow the rotary members 123 to be rotated in relation to each other and limit the angular range in which the rotary members 123 may be rotated in relation to each other. For example, even if the display element 111 is formed of a flexible display element, the bending of the display element 111 may be allowed only within a limited curvature range in order to prevent the damage of the display element 111. The inclined surfaces s1 and s2 may maintain the curvature of the flexible section portion F, on which the display element 111 is mounted, to a certain size or more.

Referring to FIG. 11, each of the facing surfaces of each two adjacent rotary members 123 may include the inclined surface s1 or s2. One inclined surface s1 or s2 is inclined in relation to the other inclined surface s1 or s2. When the flexible section portion F is arranged in a flat panel shape, between the inclined surfaces s1 and s2 within the flexible section portion F, an interval I may be formed by a certain angle, and the rotary members 123 may be rotated within the range of the interval I.

Referring to FIG. 12, when the flexible section portion F is bent to be curved, the inclined surfaces s1 and s2 of each two adjacent rotary members 123 may selectively come in contact with each other. When the inclined surfaces s1 and s2 are in contact with each other, new intervals may occur on the outer surface of the flexible section portion F. When the new intervals occur on the outer surface of the flexible section portion F, for example, when the flexible section portion F is bent to be curved, the length of the surface, on which the display element 111 is mounted (e.g., the length in the direction where the rotary members 123 are arranged) may be extended.

When a longitudinal displacement occurs on the surface, on which the display element 111 is mounted, as the flexible section portion F is bent, tension may be applied to the display element 111, and the tension may cause the damage of the display element 111. According to various embodiments to the present disclosure, the display element 111 may be disposed to be fixed to the rigid section portion R and to be slidable in relation to the flexible section portion F. For example, both side edges of the display element 111 may be slid within the support slits 127b formed in the rotary members 123. Since the display element 111 is slidable in relation to the rotary members 123, it is possible to prevent the tension from being applied to the display element 111 even if the longitudinal displacement occurs on the outer surface of the flexible section portion F.

Figure 13:
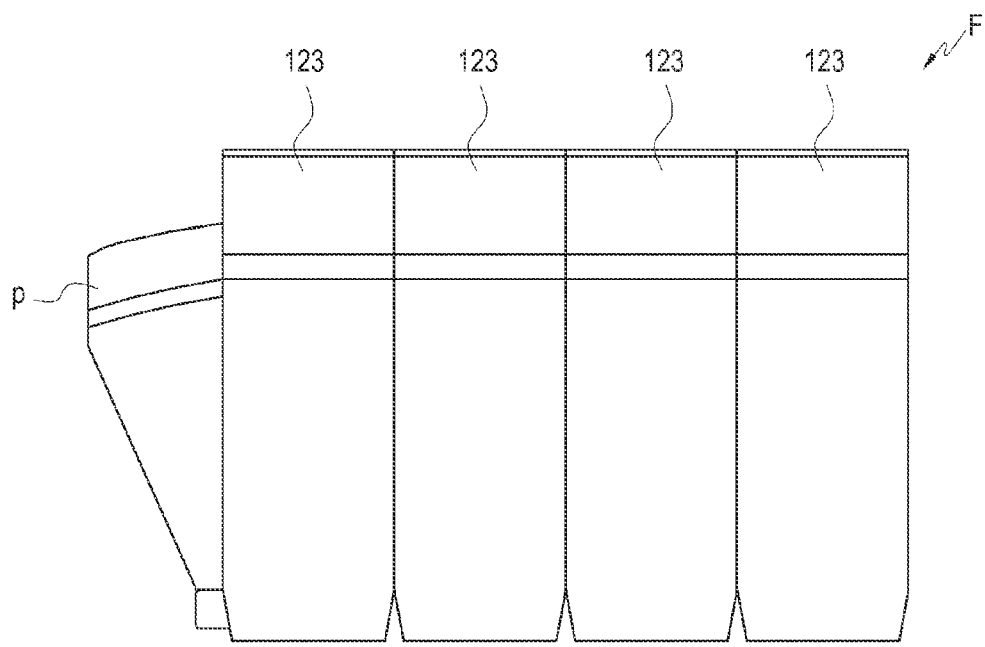
FIG. 13 is a side view illustrating a part of a main body of an electronic device according to an embodiment of the present disclosure.

FIG. 13 is a side view illustrating a part of a main body of an electronic device according to an embodiment of the present disclosure.

Figure 14:
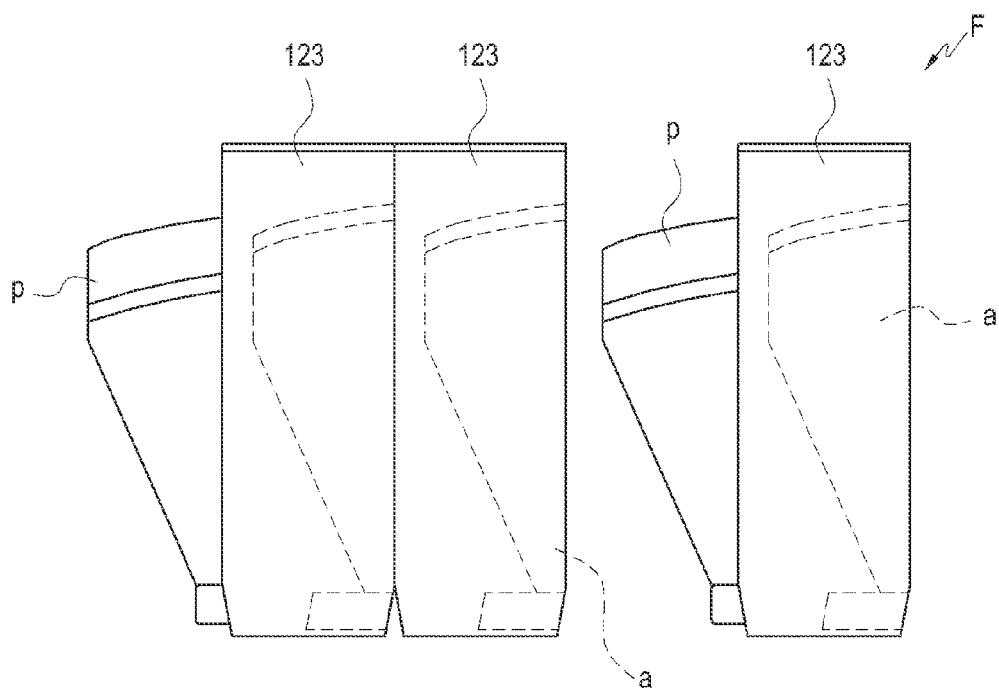
FIG. 14 is a side view illustrating a configuration of a part of a main body of an electronic device according to an embodiment of the present disclosure.

FIG. 14 is a side view illustrating a configuration of a part of a main body of an electronic device according to an embodiment of the present disclosure.

Figure 15:
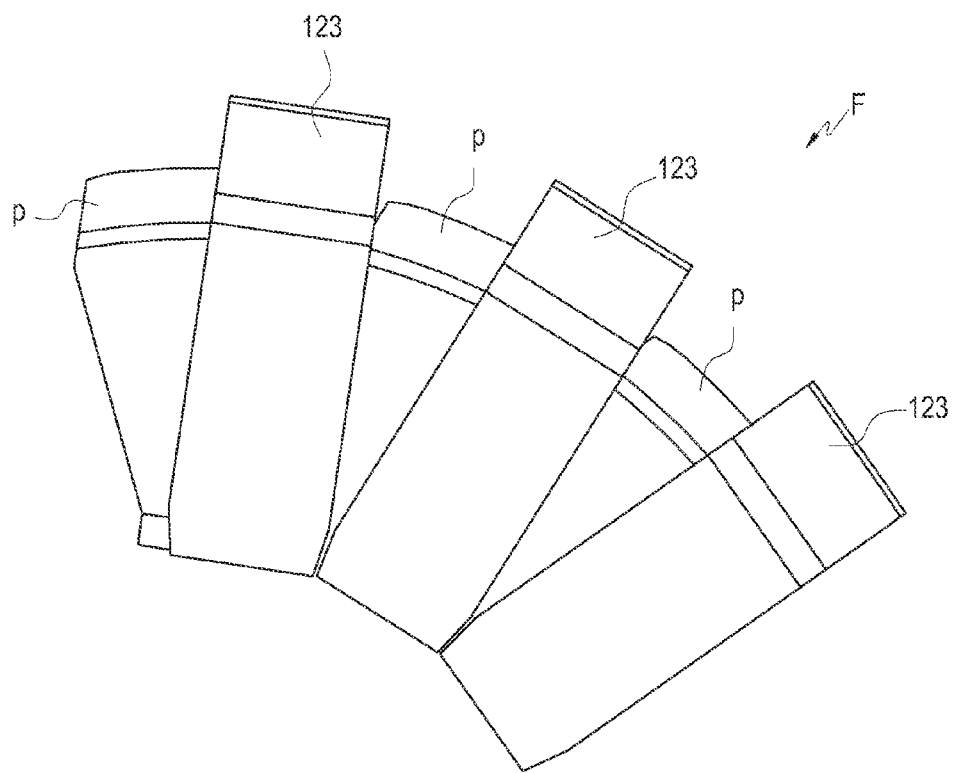
FIG. 15 is a side view illustrating a main body of an electronic device when the main body is bent to be curved according to an embodiment of the present disclosure.

FIG. 15 is a side view illustrating a main body of an electronic device when the main body is bent to be curved according to an embodiment of the present disclosure.

Referring to FIGS. 13, 14, and 15, the flexible section portion F may further include a guide member p protruding from a first surface, which is one of facing surfaces of each two adjacent rotary members 123, and an accommodation recess a formed on a second surface, which is another one of facing surfaces of each two adjacent rotary members 123.

Referring to FIG. 14, when the flexible section portion F has a flat panel shape, the guide members p may be accommodated in the accommodation recesses a, respectively.

Referring to FIG. 15, when intervals are formed between the rotary members 123 due to the bending of the flexible section portion F, the guide members p may be exposed to the intervals between the rotary members 123. Depending on the shape of the rotary members 123, the guide members p may be partially exposed between the rotary members 123 even when the flexible section portion F is maintained in the flat panel shape.

When the intervals, such as empty spaces, are formed between the rotary members 123 according to the bending of the flexible section portion F, for example, foreign matter may enter the intervals between the rotary members 123. The foreign matter may damage, for example, the display element 111 or the free stop modules. According to the bending of the flexible section portion F, the guide members p may be accommodated in the accommodation recesses a or may be exposed in the intervals between the rotary members 123 so as to suppress empty spaces from being formed between the rotary members 123. For example, the foreign matter may be prevented from entering the gaps between the rotary members 123 by using the guide members p.

Figure 16:
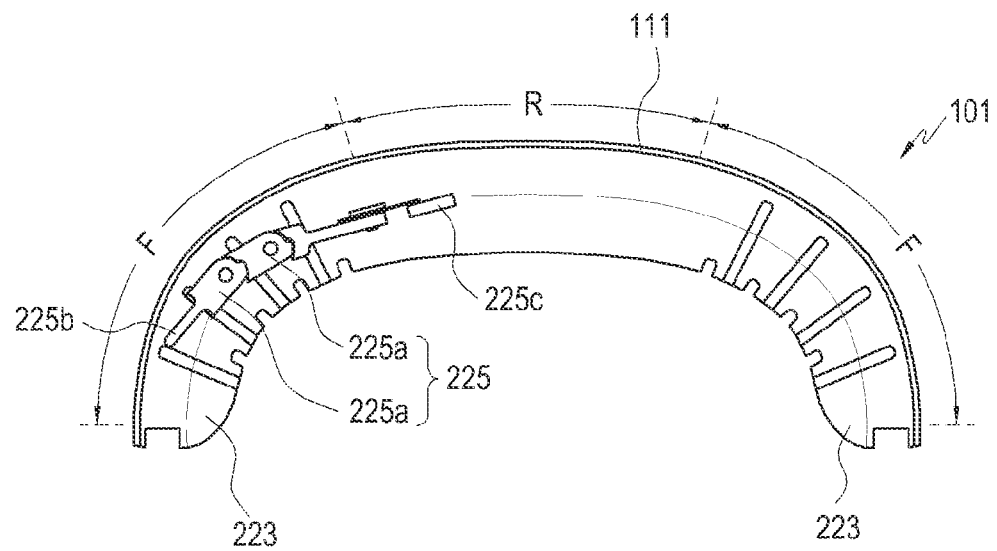
FIG. 16 is a side view illustrating a main body of an electronic device according to an embodiment of the present disclosure.

FIG. 16 is a side view illustrating a main body of an electronic device according to an embodiment of the present disclosure.

Figure 17:
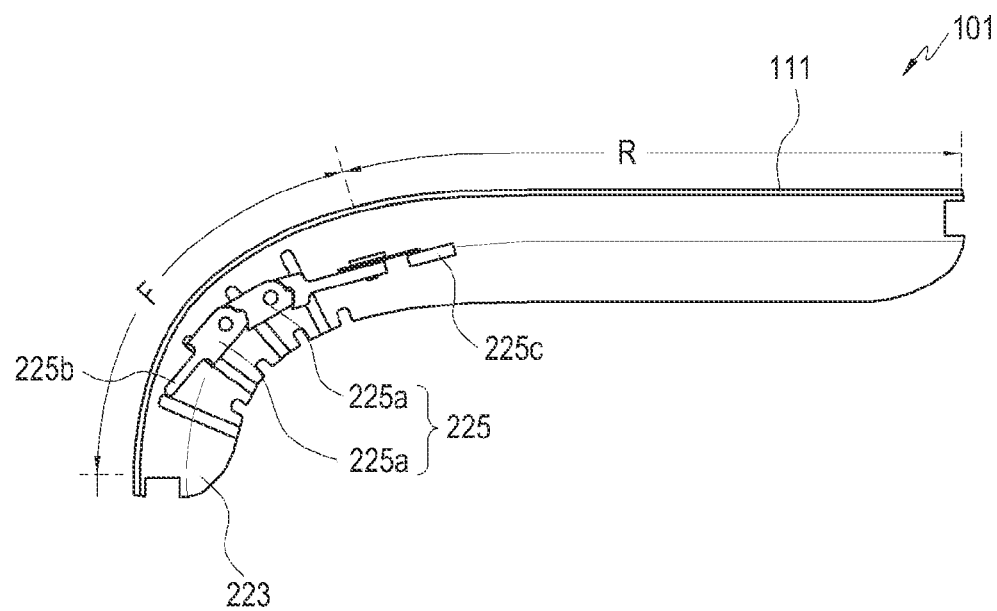
FIG. 17 is a side view illustrating a main body of an electronic device according to an embodiment of the present disclosure.

FIG. 17 is a side view illustrating a main body of an electronic device according to an embodiment of the present disclosure.

Figure 18:
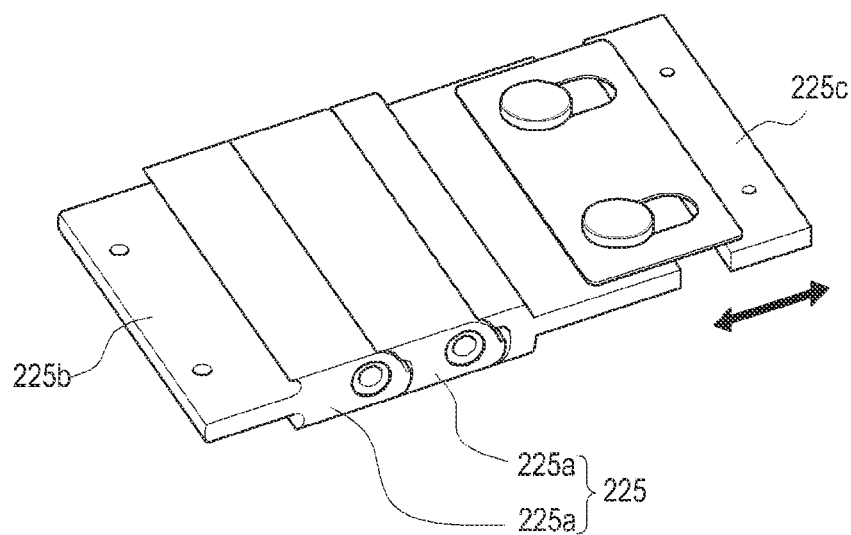
FIG. 18 is a view illustrating a chain member embedded in a main body of an electronic device according to an embodiment of the present disclosure.

FIG. 18 is a view illustrating a chain member embedded in a main body of an electronic device according to an embodiment of the present disclosure.

According to various embodiments of the present disclosure, the display element is mounted on the outer surface of the main body of the electronic device 100, the flexible section portion may be set such that no longitudinal displacement occurs on the outer surface of the flexible section portion even if the flexible section portion is bent. For example, the longitudinal displacement occurring according to the bending of the flexible section portion may be guided to occur on the inner surface of the flexible section portion. In addition, while the preceding embodiments of the present disclosure exemplify configurations in which flexible section portions are disposed at opposite sides of the rigid section portion, respectively, the flexible section portion may be disposed at only one side of the rigid section portion. According to various embodiments of the present disclosure, even if the flexible section portions are disposed at opposite sides of the rigid section portion, respectively, only one of the flexible section portions may be bent depending on the position where the electronic device 100 is worn.

Referring to FIG. 16, the flexible section portion F may include a band member 223, in which at least the inner surface of the band member 223 is formed in a bellows structure. The band member 223 may be made of an elastic material, such as silicon or rubber. In addition, the band member 223 may be fabricated by using the structure of the rotary members 123 of the preceding embodiments of the present disclosure. For example, the band member 223 may be made of a metal or a synthetic resin material. According to the bending of the flexible section portion F, the length of the flexible section portion F (e.g., the band member) may be contracted or extended on the inner surface thereof The band member 223 has a flexible structure capable of being bent to be curved. When the flexible section portion F further includes a chain member chain member 225, the bent shape of the flexible section portion F can be constantly maintained. The chain member 225 is accommodated in the band member 223 and may include at least one pair of hinge members 225a, which are rotatably coupled to each other. Similarly to the preceding embodiments of the present disclosure, the hinge members 225a are coupled to each other by a free stop module to be provided with a restraint force so that the hinge members 225a can be maintained in a stopped state in relation to each other. When the hinge members 225a are maintained in the stopped state in relation to each other, the unnecessary bending of the display element 111 can be prevented.

Referring to FIG. 17, the flexible section portion F may be disposed only at one side of the rigid section portion R. The flexible section portion F may include a band member 223 which accommodates the chain member 225, and the band member 223 may include a bellows structure on the inner surface of the flexible section portion F. The configuration of the flexible section portion F may be implemented to be similar to that of the flexible section portion of the embodiment of the present disclosure illustrated in FIG. 16. However, the flexible section portion F of the electronic device 100 according to the present disclosure is different from those of the preceding embodiments of the present disclosure in that the flexible section portion F is disposed on only one side of the rigid section portion R. For example, according to various embodiments of the present disclosure, in configuring the main body 101 in the electronic device 100, the flexible section portion F may be disposed on at least one side of the rigid section portion R, and based on, for example, the size, wearing position, and external appearance of the electronic device 100, the flexible section portion F may also be disposed on each side of the rigid section portion R.

Referring to FIG. 18, the opposite ends of the chain member 225 may be connected to different locations of the band member 223, respectively. For example, the flexible section portion F may include a first fixing member 225b that is fixed to one end of the chain member 225 as well as a first point of the band member 223. One end of the chain member 225 may be fixed to the first point of the band member 223 by the first fixing member 225b. The flexible section portion F may include a second fixing member 225c that is fixed to a second point of the band member 223 and slidably coupled to the other end of the chain member 225. The second fixing member 225c may be slidably bound to the other end of the chain member 225.

According to various embodiments of the present disclosure, when the flexible section portion F is bent, the longitudinal displacement on the surface, on which the display element 111 is mounted, is suppressed, and the longitudinal displacement according to the bending of the flexible section portion F may be guided to the inner surface of the flexible section portion F (e.g., the band member). According to various embodiments of the present disclosure, the longitudinal displacement may gradually increase from the outer surface to the inner surface of the band member 223. For example, when the flexible section portion F is bent, if the longitudinal displacement is minimal (e.g., 0 mm) on the surface, where the display element 111 is mounted, the longitudinal displacement may become the maximum (e.g., 2 mm) on the inner surface of the band member 223. In addition, the longitudinal displacement according to the bending of the flexible section portion F may also occur even in the portion where the chain member 225 is disposed. The second fixing member 225c may be slid in one end of the chain member 225 according to the longitudinal displacement of the flexible section portion F, which is caused by the bending.

Figure 19:
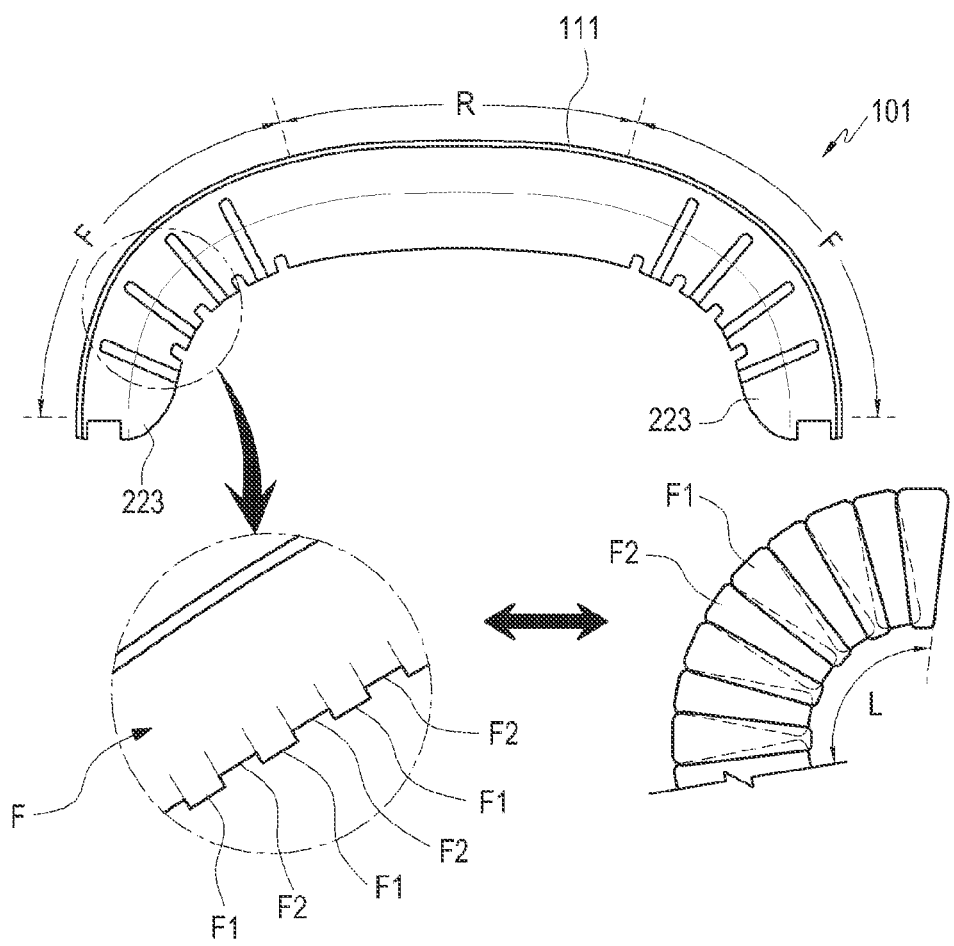
FIG. 19 is a view illustrating a main body of an electronic device where the main body of the electronic device is being bent to be curved according to an embodiment of the present disclosure.

FIG. 19 is a view illustrating a main body of an electronic device where the main body of the electronic device is being bent to be curved according to an embodiment of the present disclosure.

Referring to FIG. 19, the flexible section portion F may be implemented in a bellows structure. For example, the flexible section portion F may have a tube shape in which flexible joints F1 and rigid joints F2 are alternately connected to each other, and may be implemented more diversely according to various embodiments of the present disclosure. When the flexible section portion F is bent to be curved, the rigid joints may get closer to each other as the flexible joints F1 contract on the inner surface of the flexible section portion F. According to the contraction of the flexible joints F1, the length L of the inner surface of the flexible section portion F may also decrease. Even if the flexible section portion F is bent to be curved, on the outer surface of the flexible section portion F (e.g., the surface, on which the display element 111 is mounted), the longitudinal displacement may not occur while the curvature may be changed.

For example, the rigid joints F2 are rotated such that the outer surfaces of the rigid joints F2 are inclined in relation to the outer surfaces of the flexible joints F1, respectively, but no longitudinal displacement may occur. Since there is no longitudinal displacement on the outer surface even if the flexible section portion F is bent, the display element 111 may be fixed to the outer surface of the main body 101. For example, at least a part of the display element 111 may be fixed to the outer surface of the rigid section portion R and the other part may be fixed to the outer surface of the flexible section portion F.

As described above, according to various embodiments of the present disclosure, an electronic device may include a main body including a rigid section portion rigid section portion, and a flexible section portion extending from at least one side of the rigid section portion, and a display element, at least a portion of which is disposed on the rigid section portion and another portion is disposed on the flexible section portion. The flexible section portion is bendable to be curved in relation to the rigid section portion, and the display element may be bent to be curved in relation to the rigid section portion together with the flexible section portion.

In the electronic device as described above, two flexible section portions may extend from opposite sides of the rigid section portion in a direction away from each other.

According to various embodiments of the present disclosure, the electronic device may further include a wearing unit extending from each flexible section portion.

According to various embodiments of the present disclosure, the display element may be mounted to be fixed to one of the rigid section portion and the flexible section portion, and to be slidable in relation to another one.

In the electronic device as described above, the flexible section portion may include at least one pair of rotary members, and hinge members inserted into and fixed to the rotary members, respectively. The hinge members, which are adjacent to each other, may be coupled to each other so as to rotatably connect the rotary members.

According to various embodiments of the present disclosure, one of the hinge members may be coupled to the rigid section portion.

According to various embodiments of the present disclosure, the flexible section portion may further include support slits formed on opposite sides of an outer surface of the rotary member, respectively. Edges of the display element may be accommodated in the support slits, respectively.

According to various embodiments of the present disclosure, the rigid section portion may include additional support slits formed on opposite sides of an outer surface thereof, respectively. The support slits of the rigid section portion and the additional support slits of the flexible section portion may be connected to each other so as to partially accommodate and support opposite edges of the display element, respectively.

According to various embodiments of the present disclosure, the flexible section portion may further include a free stop module that connects the hinge members to each other. The free stop module may provide a restraint force to maintain the hinge members in a stopped state in relation to each other.

According to various embodiments of the present disclosure, the flexible section portion may further include a guide member protruding from a first surface of each of the rotary members in the pair, and an accommodation recess formed on a second surface of each of the rotary members in the pair, in which the second surface is opposite to the first surface. As the flexible section portion is bent, the guide member of one of the rotary members in the pair may be selectively accommodated in the accommodation recess of another rotary member in the pair.

According to various embodiments of the present disclosure, the flexible section portion may further include inclined surfaces that are inclined in relation to each other and face each other in the rotary members. As the rotary members are rotated in relation to each other, the inclined surfaces of the rotary members may selectively come in contact with each other.

According to various embodiments of the present disclosure, the display element may be fixed to the outer surface of each of the rigid section portion and the flexible section portion, and as the flexible section portion is bent, a length of an inner surface of the flexible section portion may be contracted or extended.

According to various embodiments of the present disclosure, the flexible section portion may further include a band member that is bendable in a direction curved in relation to the rigid section portion, and a chain member including at least one pair of hinge members accommodated in the band member and rotatably coupled to each other.

According to various embodiments of the present disclosure, the flexible section portion may further include a first fixing member that fixes one end of the chain member to a first point of the band member, and a second fixing member that is fixed to a second point of the band member and is slidably coupled to the other end of the chain member. As the flexible section portion is bent, the second fixing member may be slid in the other end of the chain member.

According to various embodiments of the present disclosure, the flexible section portion may further include a free stop module that connects the hinge members to each other, in which the free stop module provides a restraint force so as to maintain the hinge members in a stopped position in relation to the hinge members.

According to various embodiments of the present disclosure, the band member may be formed in a bellows structure on the inner surface of the flexible section portion.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a main body comprising a rigid section portion, and two flexible section portions extend from opposite sides of the rigid section portion in a direction away from each other; and
   a display element, at least a portion of which is disposed on the rigid section portion and another portion is disposed on the two flexible section portions,
   wherein the two flexible section portions are configured to be bendable to be curved in relation to the rigid section portion,
   wherein the display element is bent to be curved in relation to the rigid section portion together with the two flexible section portions,
   wherein a portion of the display element is mounted to be fixed to the rigid section portion, and another portion of the display element is slidably mounted to the two flexible section portions,
   wherein the another portion of the display element is slid along an extending direction of the two flexible section portions with respect to the two flexible section portions as the two flexible section portions are bent, and
   wherein a wearing unit extends from each flexible section portion of the two flexible section portions.

2. The electronic device of claim 1,
   wherein the two flexible section portions comprise:
      at least one pair of rotary members, and
      hinge members inserted into and fixed to the at least one pair of rotary members, respectively, and
   wherein the hinge members, which are adjacent to each other, are coupled to each other so as to rotatably connect the at least one pair of rotary members.

3. The electronic device of claim 2, wherein one of the hinge members is coupled to the rigid section portion.

4. The electronic device of claim 2,
   wherein the two flexible section portions further comprise:
      support slits formed on opposite sides of an outer surface of the at least one pair of rotary members, respectively, and
   wherein edges of the display element are accommodated in the support slits, respectively.

5. The electronic device of claim 4,
   wherein the rigid section portion comprises additional support slits formed on opposite sides of an outer surface thereof, respectively, and
   wherein the additional support slits of the rigid section portion and the support slits of the two flexible section portions are connected to each other so as to partially accommodate and support opposite edges of the display element, respectively.

6. The electronic device of claim 2, wherein the two flexible section portions further comprise:
   a free stop module configured to:
      connect the hinge members to each other, and
      provide a restraint force to maintain the hinge members in a stopped state in relation to each other.

7. The electronic device of claim 2,
   wherein the two flexible section portions further comprise:
      a guide member protruding from a first surface of each of the at least one pair of rotary members, and
      an accommodation recess formed on a second surface of each of the at least one pair of rotary members, the second surface being opposite to the first surface, and
   wherein, as the two flexible section portions are bent, the guide member of one of the at least one pair of rotary members in the pair is selectively accommodated in the accommodation recess of another one of the at least one pair of rotary members in the pair.

8. The electronic device of claim 2,
   wherein the two flexible section portions further comprise:
      inclined surfaces which are inclined in relation to each other and face each other in the at least one pair of rotary members, and
   wherein, as the at least one pair of rotary members are rotated in relation to each other, the inclined surfaces of the at least one pair of rotary members selectively come in contact with each other.

9. The electronic device of claim 2, wherein the at least one pair of rotary members comprise a seating recess opened above the surface on which the display element is mounted.

10. The electronic device of claim 1,
    wherein the display element is fixed to the outer surface of each of the rigid section portion and the two flexible section portions, and
    wherein, as the two flexible section portions are bent, a length of an inner surface of the two flexible section portions is contracted or extended.

11. The electronic device of claim 10, wherein the two flexible section portions further comprise:
    a band member configured to be bendable in a direction curved in relation to the rigid section portion; and
    a chain member comprising at least one pair of hinge members accommodated in the band member and rotatably coupled to each other.

12. The electronic device of claim 11,
    wherein the two flexible section portions further comprise:
       a first fixing member configured to fix one end of the chain member to a first point of the band member, and a second fixing member configured to be fixed to a second point of the band member and is slidably coupled to the other end of the chain member, and wherein, as the two flexible section portions are bent, the second fixing member is slid in the other end of the chain member.

13. The electronic device of claim 11, wherein the two flexible section portions further comprise:

a free stop module configured to:
   connect the at least one pair of hinge members to each other, and
   provide a restraint force so as to maintain the at least one pair of hinge members in a stopped position in relation to the at least one pair of hinge members.

14. The electronic device of claim 11, wherein the band member is formed in a bellows structure on the inner surface of the two flexible section portions.

* * * * *